(12) United States Patent
Hussain et al.

(10) Patent No.: US 12,326,267 B1
(45) Date of Patent: Jun. 10, 2025

(54) HVAC CONTROLLER AND A METHOD FOR TESTING HVAC SYSTEMS

(71) Applicant: CONNECTM TECHNOLOGY SOLUTIONS, INC., Marlborough, MA (US)

(72) Inventors: Nayeem M. Hussain, Union City, NJ (US); Mahesh Choudhury, Westborough, MA (US); Bhaskar Panigrahi, Southborough, MA (US); Vinay Kumar, Westborough, MA (US); Kevin Stateham, Oxford, MA (US); Ryan T. Fant, Chicago, IL (US)

(73) Assignee: CONNECTM TECHNOLOGY SOLUTIONS, INC., Marlborough, MA (US)

( * ) Notice: Subject to any disclaimer, the term of this patent is extended or adjusted under 35 U.S.C. 154(b) by 610 days.

(21) Appl. No.: 17/696,500

(22) Filed: Mar. 16, 2022

Related U.S. Application Data

(60) Provisional application No. 63/169,491, filed on Apr. 1, 2021.

(51) Int. Cl.
| | |
|---|---|
| *F24F 11/88* | (2018.01) |
| *F24F 11/49* | (2018.01) |
| *G05B 23/02* | (2006.01) |
| *G05D 23/19* | (2006.01) |
| *F24F 11/64* | (2018.01) |

(52) U.S. Cl.
CPC ............ *F24F 11/49* (2018.01); *F24F 11/88* (2018.01); *G05B 23/02* (2013.01); *G05D 23/1917* (2013.01); *F24F 11/64* (2018.01)

(58) Field of Classification Search
CPC .............................. F24F 11/49; G05B 23/00
USPC .................................... 62/125, 127; 236/1 C
See application file for complete search history.

(56) References Cited

U.S. PATENT DOCUMENTS

| | | | |
|---|---|---|---|
| 4,266,097 A | 5/1981 | Cannon et al. | |
| 5,816,059 A | 10/1998 | Ficchi, Jr. et al. | |
| 6,851,621 B1 | 2/2005 | Wacker et al. | |
| 8,994,539 B2 | 3/2015 | Grohman et al. | |
| 9,188,508 B1 | 11/2015 | Meyer | |
| 9,778,640 B2 | 10/2017 | Salter | |
| 2006/0247826 A1 | 11/2006 | Green et al. | |
| 2010/0163634 A1 | 7/2010 | Klein et al. | |
| 2012/0072029 A1 | 3/2012 | Persaud et al. | |

(Continued)

*Primary Examiner* — Jerry-Daryl Fletcher
*Assistant Examiner* — Daniel C Comings
(74) *Attorney, Agent, or Firm* — Myers Wolin, LLC

(57) ABSTRACT

An HVAC controller is provided having a plurality of control terminals for connecting to corresponding control terminals on an indoor unit for an HVAC system, at least one controller power terminal for connecting to a power terminal on the indoor unit for the HVAC system, and at least one shutoff terminal for connecting to a power terminal on a thermostat for the HVAC system, and a controllable power relay electrically coupling the shutoff terminal and the controller power terminal. Interrupting power from the power terminal on the thermostat deactivates the thermostat. The controllable power relay is closed during normal HVAC system usage and is opened for a testing process, and the shutoff terminal is the only connection between the HVAC controller and the thermostat that is not electrically coupled with the indoor unit.

20 Claims, 10 Drawing Sheets

(56) References Cited

U.S. PATENT DOCUMENTS

| | | | |
|---|---|---|---|
| 2015/0159905 A1* | 6/2015 | Lau | F24D 19/1084 62/89 |
| 2016/0102877 A1 | 4/2016 | Griffin et al. | |
| 2019/0285298 A1 | 9/2019 | Ajamian et al. | |
| 2020/0041155 A1* | 2/2020 | Arensmeier | G05B 23/0221 |
| 2020/0056793 A1 | 2/2020 | Etemadi | |

* cited by examiner

HVAC CONTROLLER AND A METHOD FOR TESTING HVAC SYSTEMS

CROSS REFERENCE TO RELATED APPLICATIONS

This invention claims the benefit of U.S. Provisional Patent Application No. 63/169,491, filed Apr. 1, 2021, the contents of which are incorporated by reference herein.

FIELD OF THE INVENTION

The present invention relates generally to HVAC (Heating, Ventilation, and Air Conditioning) control systems and methods. More particularly, the present invention relates to systems and methods for testing HVAC systems.

BACKGROUND

Maintenance of HVAC systems is often neglected by users, such as homeowners. As such, users ignore HVAC systems during off seasons, when the corresponding systems are not being used or stressed, and preventative maintenance is not performed. Because of this, users cannot be confident in how their HVAC system will perform when under stress, and HVAC systems tend to fail at the worst possible times, since heating systems, for example, are subjected to the most stress on the coldest days of the year, while cooling systems are subjected to the most stress on the hottest days of the year.

There is a need to test HVAC systems at a time when the HVAC systems otherwise would not be under stress, so as to identify any potential maintenance, repair, and installation issues that can be addressed by users before their HVAC systems fail. There is a further need to run such tests during the off season at a time when HVAC system failure can be addressed with less urgency than a failure during the heating or cooling season.

There is a further need for any system for testing HVAC systems to be controlled and monitored by a third party that can advise a system user as to potential maintenance, repair, and installation issues. There is a further need that such a system be compatible with HVAC systems regardless of what thermostat is installed.

SUMMARY

A pre-season test ("PST") of HVAC equipment ensures safe and proper operation. Performing a PST as preventative maintenance can help guard against poor performance, imminent breakdowns, and unnecessarily high utility costs for an HVAC system. In some systems, it can help guard against carbon monoxide and safety issues. In all cases, it can help avoid unexpected and costly repairs on the most severe weather days of summer/winter, as well as long, uncomfortable wait times when everyone else who has skipped routine service and maintenance has scheduled an emergency repair call too.

In some embodiments, a software or firmware module, henceforth called PST, runs a pre-season test in a controlled and cost-effective manner. In some embodiments, the PST is run on a hardware HVAC controller. Here are some of the main application functions:

This application takes over or replaces the thermostat during the pre-season tests. The application then runs controlled heating or cooling for a pre-configured period of time, and produces detailed reports of HVAC operation. These reports provide recommendations on HVAC readiness for the upcoming season.

In some embodiments, the PST software implements two distinct pre-season tests to address harsh winter and upcoming summer seasons.

In some embodiments, the PST is implemented as a software module, where the software is executed on a programmable thermostat as a plug-in. The thermostat should then allow the external application on the thermostat platform.

In some embodiments, the PST is implemented as a software module, where the software is executed directly on a programmable circuit board for controlling HVAC equipment, occasionally referred to herein as an HVAC controller.

In some embodiments, the PST is executed on a remote interface, such as a cloud-based server, or is executed by a user's mobile phone. Where the underlying thermostat is compatible, a user may pass authentication data to a cloud containing the PST application. The PST application then runs the pre-season test using a provided REST interface. Where the underlying thermostat is controllable by a smartphone application, the PST may be provided in the form of an application stored on a smartphone or tablet.

In some embodiments, the PST application may be provided on a monitoring board, also referred to herein as an HVAC controller. Such a monitoring board may be universal, or nearly universal, and may function with minimal interaction with a thermostat for the HVAC system. Such a monitoring board may be connected directly to an HVAC indoor unit, such as an air handler or furnace or electric strip, may provide internet connectivity such as Wi-Fi and/or cellular connections, and may be provided with terminals and relay switches that may be used to directly control the HVAC internal unit in much the same way as a thermostat would. Accordingly, when a user, or a party authorized by the user, chooses to run the PST application, the HVAC controller may assume control from the thermostat and perform the pre-season test.

The HVAC controller may contain sensors for measuring temperature and/or pressure in both normal operation of the HVAC system as well as during the operation of the PST application. The PST application may then implement a testing sequence to be performed by the HVAC system, and the sequence may be implemented by way of the terminals provided. The user or third party may then be provided with a report generated by the performance board based on the output of the sensors.

Such a report may demonstrate how the HVAC system responded to the testing sequence. Such a testing sequence may simulate extreme conditions by instructing a heating system to operate at its most extreme settings for a period of time. The performance board may then record data at the sensors to determine if the HVAC system performed as expected in such simulated extreme conditions.

In some embodiments, the performance board is connected to the HVAC unit in parallel, and not in sequence, with the thermostat. As such, the performance board cannot prevent the transmission of commands from a thermostat to the HVAC unit. Instead, the performance board deactivates the thermostat to prevent the thermostat from attempting to control the HVAC unit. This may be by emulating a shutoff signal or by terminating a power transmission to the thermostat, thereby simulating an emergency shutoff and preventing the thermostat from providing activation signals at terminals.

In some embodiments, when the system is in a pre-season mode, all alerts are silenced so that they do not get relayed to users and so that they do not show up in system records. This may be by adding a header in the code causing the system to ignore the alerts.

In some embodiments, the implementation may be by a purely software-based approach. This may be, for example, by flashing a thermostat's firmware with custom code to perform this remote control testing directly from the thermostat and avoiding the need for custom hardware.

While the embodiments described herein are discussed in terms of a preseason test, it is noted that the devices and methods described can implement testing sequences at any time, and can therefore be used to diagnose system issues and predict system failures in season as well as during the off season.

In some embodiments, an HVAC controller is provided having a plurality of control terminals for connecting to corresponding control terminals on an indoor unit for an HVAC system, at least one controller power terminal for connecting to a power terminal on the indoor unit for the HVAC system, at least one shutoff terminal for connecting to a power terminal on a thermostat for the HVAC system, wherein interrupting power from the power terminal on the thermostat deactivates the thermostat, and a controllable power relay electrically coupling the shutoff terminal and the controller power terminal.

The controllable power relay is closed during normal HVAC system usage and is opened for a testing process, and the shutoff terminal is the only connection between the HVAC controller and the thermostat that is not electrically coupled with the indoor unit.

In some such embodiments, the HVAC controller further includes a plurality of controllable control relays for powering the control terminals of the HVAC controller. In some such embodiments, the control terminals are controlled by a first relay for controlling a furnace terminal or reversing valve of a heat pump terminal of the control terminals, a second relay for controlling an air conditioner or heat pump terminal of the control terminals, and a third relay for controlling a fam terminal of the control terminals.

In some embodiments, at least one of the plurality of control terminals are activated by the HVAC controller only when the controllable power relay is open.

In some embodiments, the HVAC controller further comprises at least one temperature sensor, wherein the HVAC controller generates a data record comprising data from the temperature sensor upon activation of at least one of the plurality of control terminals.

In some such embodiments, the HVAC controller further comprises at leas tone pressure sensor, wherein the data record further comprises data from the pressure sensor.

In some embodiments, at least a portion of the data record generated comprises a header embedded in a section of generated code, wherein the header prevents the HVAC system from recognizing data in the data record.

In some such embodiments, the plurality of control terminals are activated in a predetermined sequence, and the data record reflects the results of activation of the control terminals. In some alternative embodiments, the data record is generated during all power relay configurations, and the data record comprises the header only for data corresponding to times when the power relay is open.

Also provided is a method for testing an HVAC system, the method comprises providing an HVAC controller, the HVAC controller comprising a plurality of control terminals, the plurality of control terminals being coupled to corresponding control terminals on an indoor unit for the HVAC system, and at least one controller power terminal for connecting to a power terminal of the indoor unit.

The method proceeds by transmitting an electronic shutoff signal to a thermostat for the HVAC system or interrupting power provided to the thermostat thereby deactivating the thermostat. The method then directly controls the indoor unit by way of at least one of the plurality of control terminals after deactivating the thermostat.

In some embodiments, the deactivating of the thermostat is by terminating the provision of power from a shutoff terminal of the HVAC controller, and the shutoff terminal is the only connection between the HVAC controller and the thermostat that is not directly coupled to the indoor unit.

In some such embodiments, during normal use the shutoff terminal is electrically coupled to the controller power terminal by a closed power relay, and the power relay is opened after initiating the testing method.

In some embodiments, a current terminal status of the indoor unit, retrieved at the control terminals of the HVAC controller, is stored in a memory prior to transmitting the electronic shutoff signal.

In some embodiments the method includes energizing at least two of the control terminals of the HVAC controller in sequence for a preset period of time.

In some such embodiments, the method further includes deenergizing all control terminals following the energizing of the at least two control terminals and closing the power relay after deenergizing all control terminals.

In some such embodiments, the method further includes generating a data record by recording the output of sensors associated with the HVAC controller. The data record incorporates data in a first format during normal use, and the data record incorporates data in a second format during testing. The data record then transitions from the first format to the second format prior to transmitting the electronic shutoff signal and the data record transitions from the second format to the first format after closing the power relay. The second format incorporates a sensor data header indicating a test sequence.

In some such embodiments the transition from the second format to the first format is delayed a predetermined period of time following the closing of the power relay.

In some embodiments the HVAC controller processes data from the data record and generates alerts based on predetermined patterns within the data record, and such alerts are generated only based on data in the first format.

In some embodiments the method analyzes a change in temperature during the test sequence based on the data in the second format.

In some embodiments, the method is an implementation of a heating or cooling test and the method includes monitoring an outdoor ambient temperature and confirming that the temperature is above or below a threshold temperature associated with the corresponding heating or cooling test prior to initiating the test.

DETAILED DESCRIPTION OF THE PREFERRED EMBODIMENTS

Figure 1:
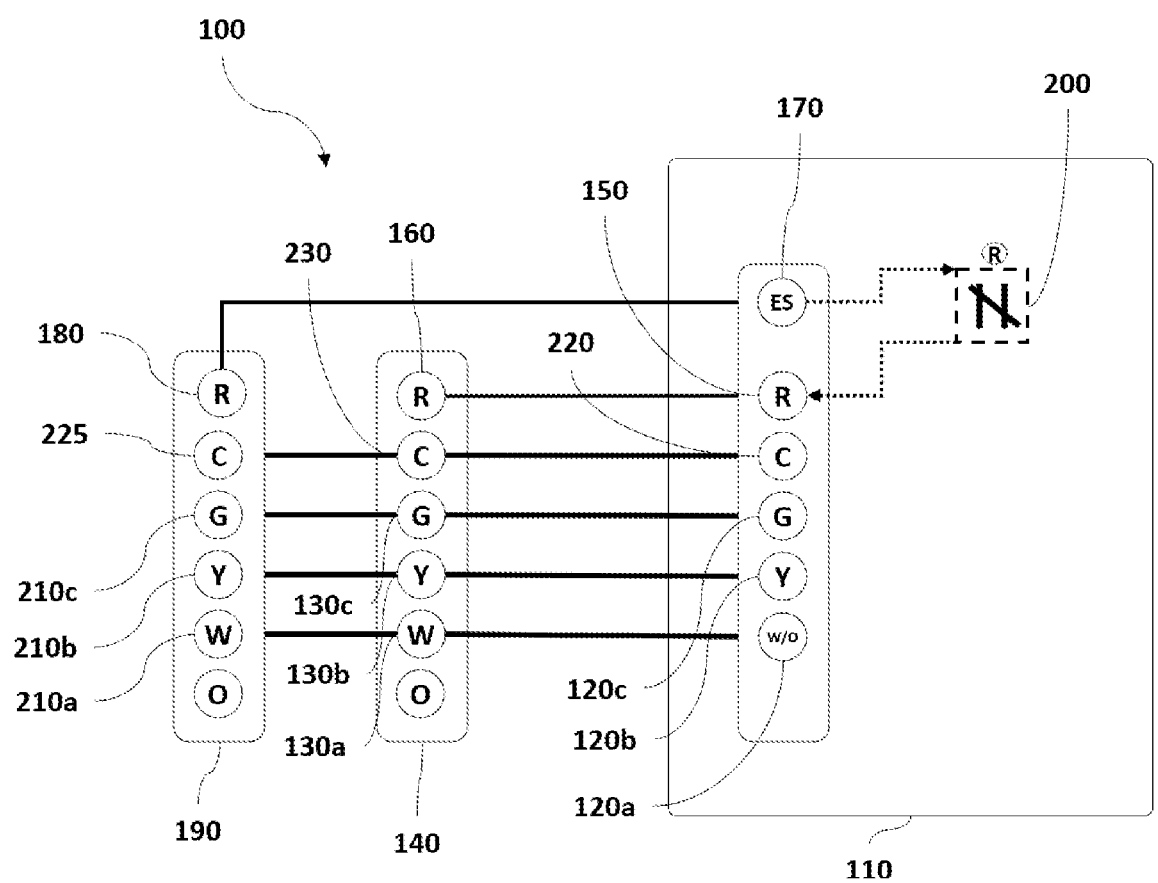
FIG. 1 is a schematic diagram of an HVAC controller in an HVAC system.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

In some embodiments of the method discussed herein, an HVAC controller is provided that directly controls an HVAC system by way of an indoor unit. As described herein, the HVAC controller is installed in parallel with a thermostat, and therefore cannot prevent transmission of messages from the thermostat to the HVAC unit. Instead, the HVAC controller leverages an emergency shut off functionality of the thermostat to deactivate the thermostat. Such emergency shut off functionality is typically provided at thermostats so that they can be deactivated by the indoor unit itself.

Figure 2:
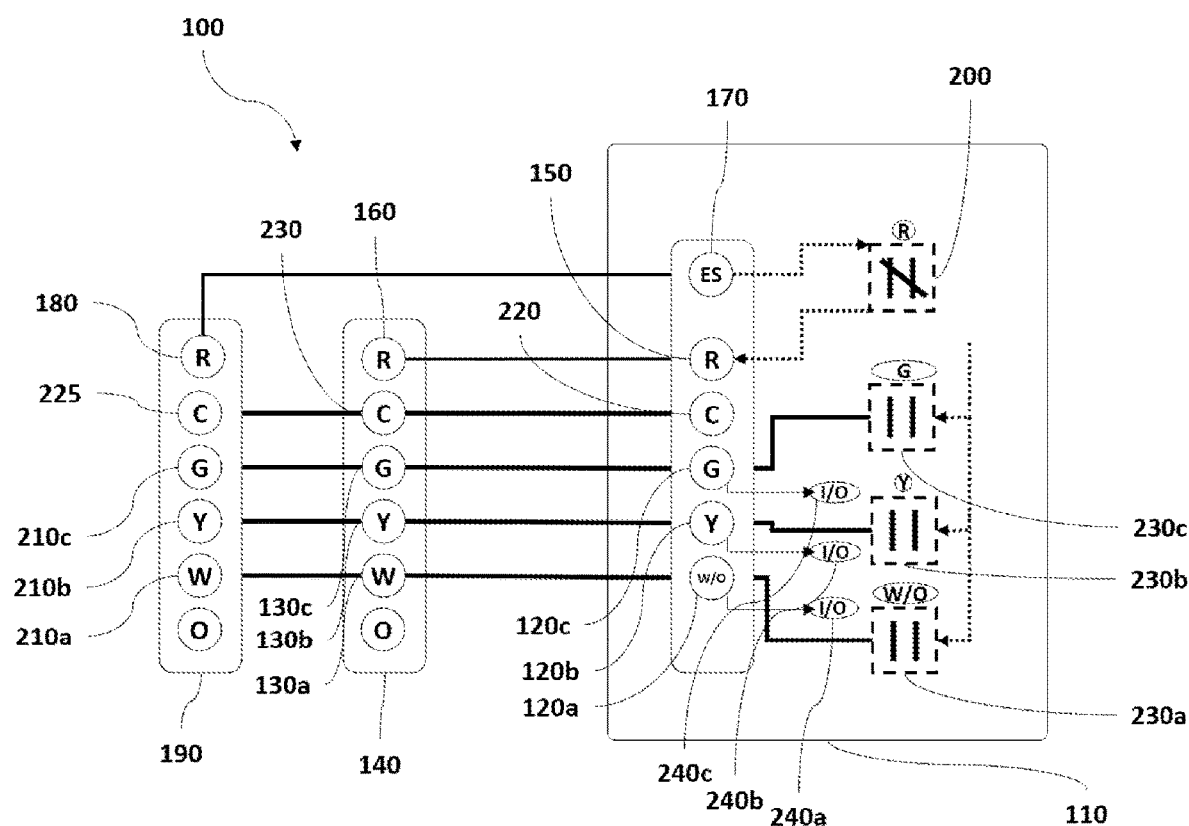
FIG. 2 is a schematic diagram illustrating wiring between an HVAC controller, a thermostat, and an indoor unit, in the HVAC system of FIG. 1 during normal operation.
Figure 3:
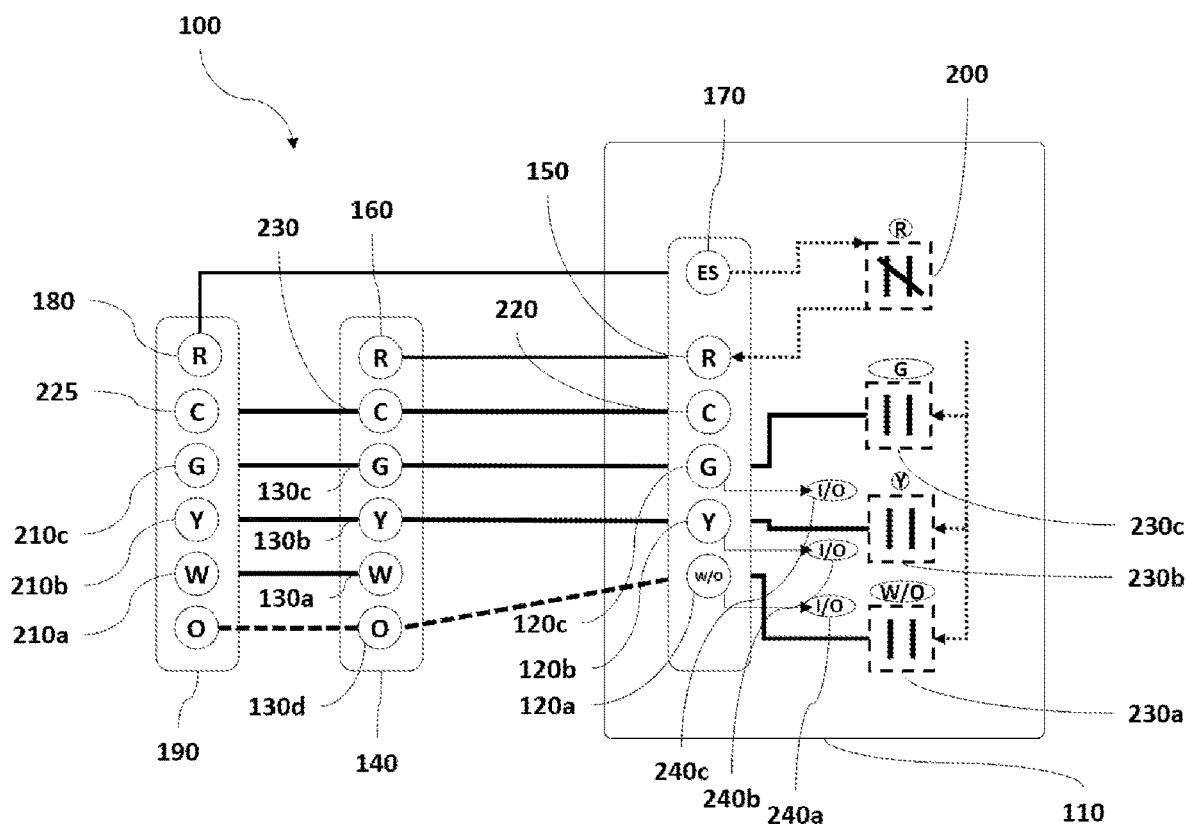
FIG. 3 is a schematic diagram illustrating wiring between an HVAC controller, a thermostat, and an indoor unit, in an alternative implementation of the HVAC system of FIG. 1 during normal operation.

Such an embodiment is described in more detail in reference to FIGS. 1-7, in which FIGS. 2-3 show the HVAC controller configured for normal operation in two different HVAC system implementations and FIGS. 4-7 show the use of the HVAC controller to implement embodiments of the method described.

In some embodiments, the method can be implemented by way of software that either controls the thermostat externally or is located within thermostat firmware or local memory. These approaches will be discussed in more detail below in reference to FIGS. 8-10.

Generally, the HVAC controller and method are described in the context of a preseason testing method. In such a method, the HVAC controller may be used during the off season to test cooling and heating functionality of an HVAC system. For example, a heating system might be tested during the summer and a cooling system might be tested during the winter. Alternatively, the HVAC controller and method described could be used for different types of testing as well, such as various system stress tests. Further, the HVAC controller may be provided with hardware and/or software for monitoring the HVAC system during normal conditions and triggering an alert if an issue is detected. Similarly, the HVAC system may initiate or recommend a stress test in the event of a specific condition being detected during such normal monitoring.

FIG. 1 is a schematic diagram of an HVAC controller 110 in an HVAC system 100. As shown, the HVAC controller 110 has a plurality of control terminals 120a, b, c for connecting to corresponding control terminals 130a, b, c on an indoor unit 140 for the HVAC system 100.

In addition to the control terminals 120a, b, c, the HVAC controller also has a controller power terminal 150 for connecting to a corresponding power terminal 160 on the indoor unit 140 and a shutoff terminal 170 for connecting to a power terminal 180 on a thermostat 190 for the HVAC system 100. A controllable power relay 200 is provided electrically coupling the shutoff terminal 170 and the controller power terminal 150, such that when the controllable power relay is closed, the shutoff terminal and the controller power terminal are electrically coupled and when the controllable power relay is open, the shutoff terminal and the controller power terminal are disconnected.

The shutoff terminal 170 is the only connection between the HVAC controller 110 and the thermostat 190 that is not electrically coupled with the indoor unit 140. This is in contrast with the various control terminals 120a, b, c which may be connected to corresponding control terminals 210a, b, c of the thermostat 190 only because such control terminals are connected to corresponding control terminals 130a, b, c of the indoor unit 140. Some embodiments of the HVAC controller 110 may be provided with more or fewer control terminals 120a, b, c depending on a corresponding HVAC system 100 in which it is implemented.

It is noted that although a controllable power relay 200 provided electrically couples the shutoff terminal 170 and the controller power terminal 150, in some embodiments, alternative means are provided for controlling the shutoff terminal 170. For example, the relay provided may be configured differently, or an alternate means may be provided for selectively linking the power terminal 160 on the indoor unit 140 with the power terminal 180 on the thermostat 190. In some embodiments, for example, the controllable power terminal 150 is monitored to determine if it is receiving power from the power terminal 160 of the indoor unit 140, and any signal, or power, received from the indoor unit is mirrored to the thermostat 190 by way of an independent controllable shutoff terminal 170.

Also provided is a C terminal 220 which mirrors a corresponding C terminal 225 on a thermostat and receives power from a C terminal 230 on the indoor unit. The C terminal 230 is a common power terminal typically used to power a thermostat 190 or other electronics. In this case, the C terminal 220 connection is optional, and when present, may be used to power the HVAC controller 110.

Typically, the HVAC controller 110 is provided with external connections for providing instructions to the controller and for transmitting details of testing and test results, as well as sensor output, to an external device. The HVAC controller 110 may further comprise electronic circuitry and on-board memory for storing and executing instructions, and for controlling the various terminals. This may be by way of controllable relays connected to each of the controllable terminals 120a, b, c, which may be controlled by the processing circuitry or directly by commands from the external connections. Such external connections may be hardwired to the HVAC controller 110, such as a network connection, or they may be wireless communication modules, such as Wi-Fi, cellular, or various shorter range connections, such as Bluetooth.

Further, sensors provided on board as part of the HVAC controller 110 are discussed below, and various input and output connections may be provided. It will be understood that while sensors are described as provided on board, in some embodiments, sensors may be independently provided external to the HVAC controller 110. For example, sensors may be provided in independent modules that may be located at a test location, rather than at the same location as the HVAC controller 110. Further, in some embodiments, the methods may rely on sensors provided in other devices, such as smart thermostats provided as part of the HVAC system or other Internet of Things (IoT) devices installed throughout a site being tested.

FIG. 2 is a schematic diagram illustrating wiring between an HVAC controller 110, a thermostat 190, and an indoor unit 140, in the HVAC system 100 of FIG. 1 during normal operation. The configuration shown in FIG. 2 relates to an indoor unit 140 for an HVAC system 100 having a gas furnace and an air conditioner unit. FIG. 3 is a similar schematic diagram illustrating wiring between the HVAC controller 110, a thermostat 190, and an indoor unit 140, but in the context of an HVAC system 100 having a heat pump system.

In the embodiment shown, the HVAC controller 110 has 3 control terminals 120a, b, c, corresponding to control terminals 130a, b, c of the indoor unit 140. The HVAC controller 110 also has a controller power terminal 150 for connecting to a power terminal 160 of the indoor unit 140 and a shutoff terminal 170 for connecting to a power terminal 180 of a thermostat 190. The power terminals 150, 160, 180 of the HVAC controller 110, indoor unit 140, and thermostat 190 respectively are typically R terminals used as a hot power terminal in HVAC systems 100. The R terminal typically passes power from the indoor unit 140 to the thermostat 190 which routes the power to devices ultimately being controlled by the thermostat 190 by way of on-board relays.

The thermostat 190 is typically provided with control terminals 210a, b, c for controlling the indoor unit 140. For simplicity, the terminals on the thermostat are assumed to mirror those of the indoor unit 140, and all connections are assumed to be normal, other than the interposition of the HVAC controller 110 between the R terminals 160, 180 of the indoor unit 140 and the thermostat 190 respectively.

The control terminals of the HVAC controller 110 include a W/O terminal 120a. In the context of an HVAC system 100 using a furnace or a boiler, this terminal functions as a W terminal for controlling a heating system, as shown in FIG. 2. In the context of an HVAC system 100 using a heat pump system, as shown in FIG. 3, this terminal functions as an O terminal for a reversing valve.

Also provided is a Y terminal 120b for controlling a cooling system and a G terminal 120c for controlling a fan. As noted above, a C terminal 220 may be provided and may be used to power the HVAC controller 110 from a C terminal 230 of the indoor unit 140. Alternatively, the HVAC controller 110 may be powered by a different power source.

The indoor unit 140 may have additional terminals representing additional functions in some contexts. For example, the indoor unit 140 may have a separate W terminal 130a corresponding to the W/O terminal 120a in furnace based systems, and a separate O terminal 120d for controlling a reversing valve for a heat pump. In such embodiments, the indoor unit 140 would still typically have a Y terminal 130b for controlling a heat pump and a G terminal 130c for controlling a fan.

In some embodiments, additional variations are provided. For example, the indoor unit 140 may utilize both the O relay 130d for a reversing valve and the W terminal 130a for controlling a distinct heating system, such as a heater kit external to the main HVAC system. In some such embodiments, such as those shown, the HVAC controller 110 may not be provided with a control terminal for such an extra terminal. In other embodiments, additional control terminals may be provided at the HVAC controller 110.

In yet additional embodiments, a B terminal is provided for the reversing valve instead of an O terminal, and in some heat pump based embodiments, the Y terminal 120b at the HVAC controller 110 may connect to the W terminal 130a at the indoor unit 140. While the HVAC controller 110 may be installed easily by end users, such as homeowners, in common cases, some more sophisticated terminal setups may require expertise to properly match terminals.

As discussed above, the controllable power relay 200 couples the controller power terminal 150 to the shutoff terminal 170. During normal operation, as shown in FIGS. 2 and 3, the power relay 200 is closed, thereby electrically coupling the power terminal 160 of the indoor unit 140 with the power terminal 180 of the thermostat 190 by way of the controller power terminal 150. In typical HVAC systems, these R terminals are used to pass power through the thermostat 190 to individual devices being controlled by way of the corresponding control terminals 210a, b, c.

As such, during normal operation, if the indoor unit 140 fails and the HVAC system 100 initiates an emergency shutoff sequence, or otherwise fails to provide power at its power terminal 160, the thermostat 190 is no longer provided with power for transmitting to devices at the power terminal 180, R. This means that no signal can be transmitted by way of the various control terminals 210a, b, c even if the thermostat remains powered by the common C terminal 220.

As shown in FIGS. 4-7, when the HVAC controller 110 is used to implement the preseason testing method described, the controllable power relay 200 is opened, thereby cutting off power from the indoor unit 140 before it reaches the power terminal 180 of the thermostat. This typically prevents the thermostat 190 from controlling anything until power is restored by closing the controllable power relay 200, which in turn prevents the thermostat 190 from interfering with any actions taken by the HVAC controller 110 to control the indoor unit 140 directly.

As shown, the control terminals 120a, b, c are independently controlled by corresponding control relays 230a, b, c at the HVAC controller 110. These control relays 230a, b, c can take any form so long as the signals at the corresponding control terminals 120a, b, c are controllable. Accordingly, the control terminals 120a, b, c may be controlled by a first relay 230a for controlling a furnace terminal or reversing valve of a heat pump terminal 120a, a second relay 230b for controlling an air conditioner terminal or heat pump terminal 120b, and a third relay 230c for controlling a fan terminal 120c of the control terminals in the context of a furnace and air conditioner based HVAC system 100.

The control relays 230a, b, c may be directly controlled by a user, or may be controlled by a processing unit implementing the preseason testing method described. The control relays 230a, b, c may be provided with power from the controller power terminal 150, such that when the power relay 200 is opened, it provides power to the control relays instead of the shutoff terminal 170, or the control terminals may be powered in some other way.

As shown in FIGS. 2 and 3, during normal operation the controllable power relay 200 is closed and the control relays 230a, b, c are all open, such that power is provided to the power terminal 180 of the thermostat 190 and no signals are transmitted from the control terminals 120a, b, c of the HVAC controller 110. Accordingly, one or more of the control terminals 230a, b, c are typically closed only when the controllable power relay 200 is open.

Although not shown in the schematics of FIGS. 2 and 3, additional features may be provided for further supporting the preseason testing methods described herein. For example, as noted above, processing circuitry may be provided on board for implementing the preseason tests by way of the HVAC controller 110. Alternatively, each of the relays 200, 230a, b, c may be controlled by an external controller, including a processor, while such a controller may be connected to each of the controllable terminals 120a, b, c by way of an electronic connection as shown.

An electronic connection to the controllable terminals 120a, b, c may be provided as a data or signal connections 240a, b, c, such that even when the control relays 230a, b, c are open, and the controllable terminals 120a, b, c therefore cannot be activated, a status can be retrieved from each terminal. Accordingly, because each controllable terminal 120a, b, c is coupled to a corresponding control terminal 130a, b, c of the indoor system 140, and because the control terminals of the indoor system are similarly coupled to corresponding control terminals 210a, b, c of the thermostat 190, such data or signal connections 240a, b, c can be used as a probe to unobtrusively determine the current status of each relay of the thermostat 190.

As noted above, the HVAC controller 110 can be used to monitor system functions during normal usage to track the status of the HVAC system 100, which may be done by way of the controllable terminals 120a, b, c functioning as probes for the data or signal connections 240a, b, c in this manner.

Further, sensors may be provided. Accordingly, the HVAC controller 110 may further be provided with at least one temperature sensor, such that when the HVAC controller, or any external controller linked with the HVAC controller, generates a data record of the preseason test implemented, any such data record can include data from the temperature sensor generated upon activation of at least one of the control terminals 120a, b, c.

It will be understood that while the temperature sensor is discussed as a component of the HVAC controller 110, it may similarly be provided as an external module that can be installed independently from the HVAC controller and may then provide data to the HVAC controller or to a system external to the HVAC controller implementing the methods described or recording data related to such methods. Similarly, the temperature sensor may be a sensor in an existing device already installed. For example, temperature data may be drawn from existing smart thermostats independent of the HVAC controller 110, or such data may be drawn from independent IoT devices.

Similarly, a pressure sensor may be provided, such that the data record further comprises data from the pressure sensor. Additional sensors may be provided for monitoring various aspects and functionalities of the HVAC system 100 during testing, and such sensors may similarly be monitored during normal operation of the HVAC system. As noted with respect to the temperature sensors, such pressure sensors may be provided as independent components or pressure data may be retrieved from sensors incorporated into other devices. Such sensors are discussed in more detail below.

Again, although such sensors are described in the context of a preseason test, the HVAC controller 110 may use the sensors to track HVAC system 100 behavior during normal usage, and such data may be evaluated alongside data retrieved from the controllable terminals 120a, b, c and their corresponding data or signal connections 240a, b, c functioning as probes to monitor such behavior and identify potential issues during operation.

Figure 4:
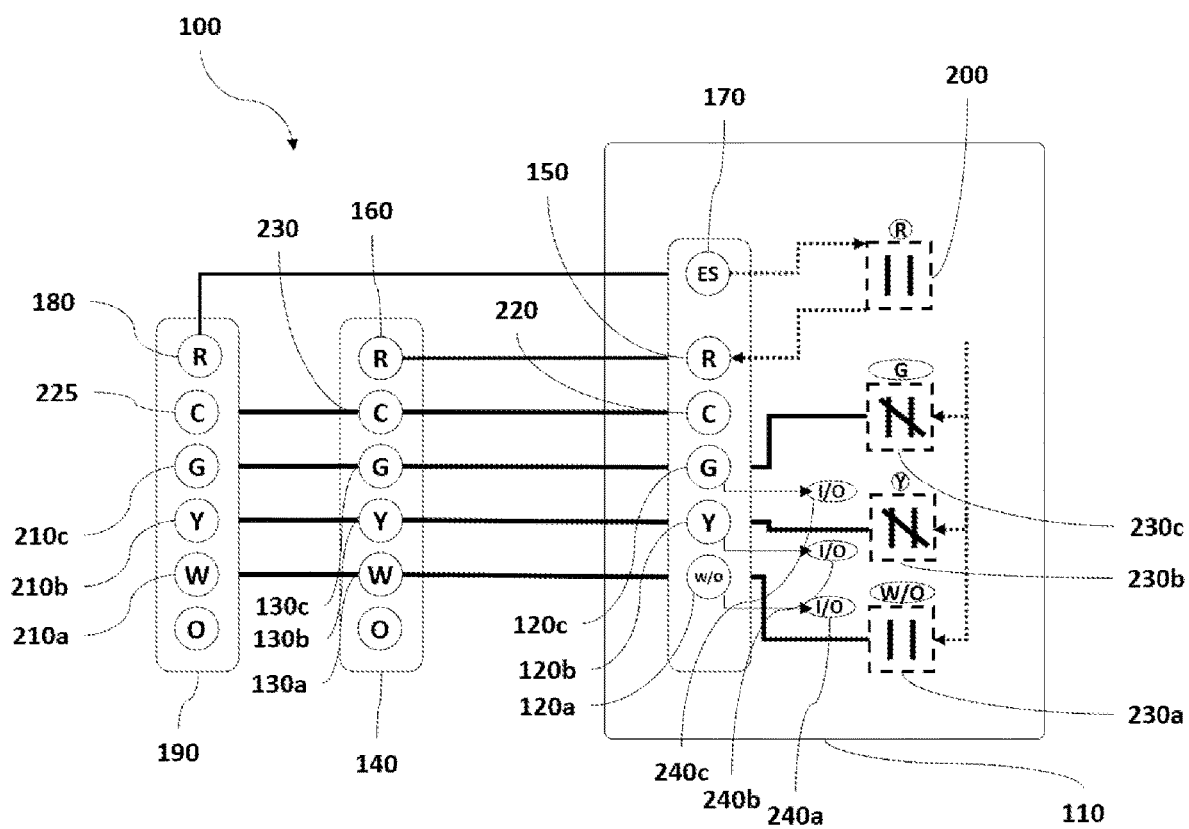
FIG. 4 shows the HVAC system of FIG. 1 when implementing a cooling test in the implementation of FIG. 2.

FIG. 4 shows the HVAC system 100 of FIG. 2 when implementing a cooling test. As shown, the HVAC controller 110 is incorporated into the HVAC system 100 as shown in FIG. 2, and the controllable power relay 200 of the HVAC controller 110 is opened.

As discussed in more detail below with respect to FIG. 8, the cooling test, as in the case of other preseason tests, may follow a specific sequence. Generally, after opening the controllable power relay 200, the control relays 230a, b, c of the HVAC controller 110 can be used to directly control the indoor unit 140. As such, in the case of a furnace and air conditioner based HVAC system 100, the cooling test may call for energizing the Y and G control terminals 120b, c by closing the corresponding control relays 230b, c, thereby activating the fan and air conditioning equipment.

After implementing the testing procedure, the control relays 230b, c used during the testing are returned to their open state and the controllable power relay 200 is once again closed, thereby returning the HVAC system 100 to its normal operation state, as shown in FIG. 2.

Figure 5:
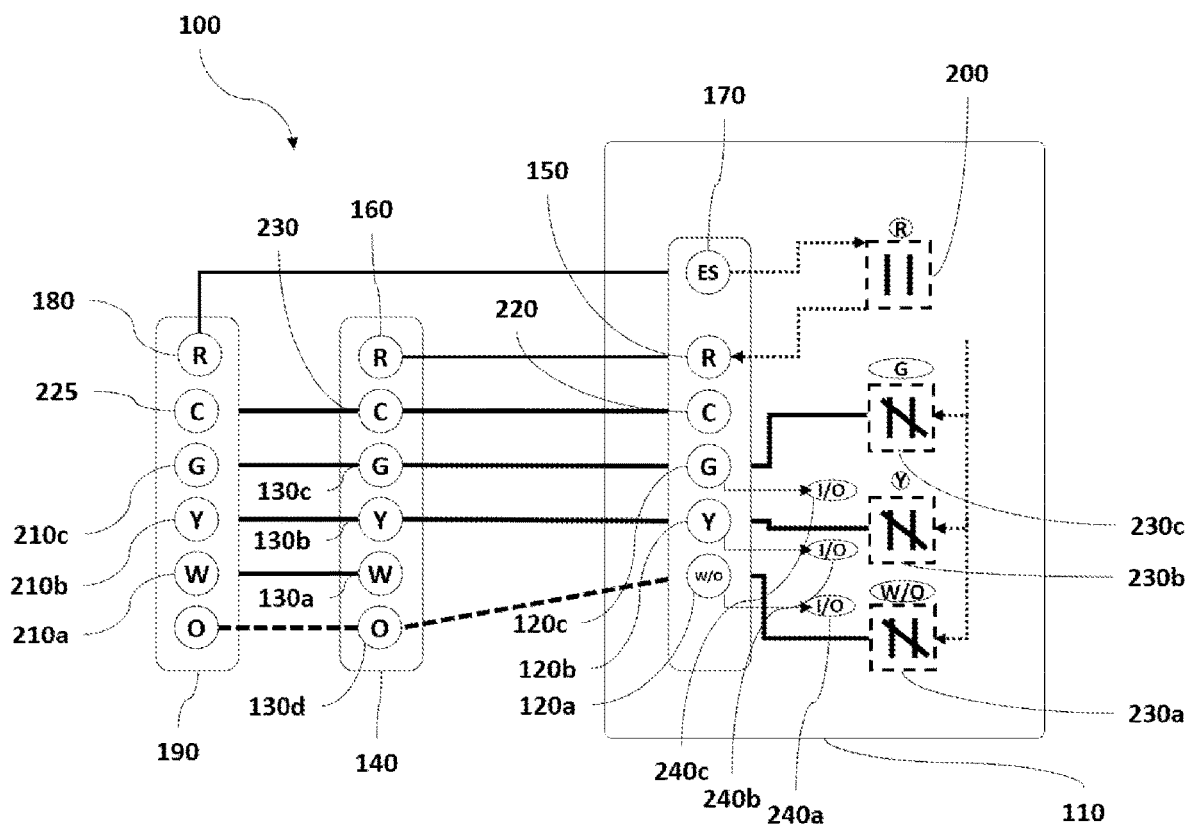
FIG. 5 shows the HVAC system of FIG. 1 when implementing a cooling test in the alternative implementation of FIG. 3.

FIG. 5 shows the HVAC system 100 of FIG. 3 when implementing a cooling test. As shown, the HVAC controller 110 is incorporated into the HVAC system 100 as shown in FIG. 3, and the controllable power relay 200 of the HVAC controller 110 is opened.

As discussed in more detail below, with respect to FIG. 8, the cooling test, as in the case of other preseason tests, may follow a specific sequence. Generally, after opening the controllable power relay 200, the control relays 230a, b, c of the HVAC controller 110 can be used to directly control the indoor unit 140. As such, in the case of a heat pump based HVAC system 100, the cooling test may call for energizing each of the W/O, Y, and G control terminals 120a, b, c by closing the corresponding control relays 230a, b, c, thereby activating the fan, reversing valve, and heat pump.

After implementing the testing procedure, the control relays 230a, b, c used during the testing are returned to their open state and the controllable power relay 200 is once again closed, thereby returning the HVAC system 100 to its normal operation state, as shown in FIG. 3.

Figure 6:
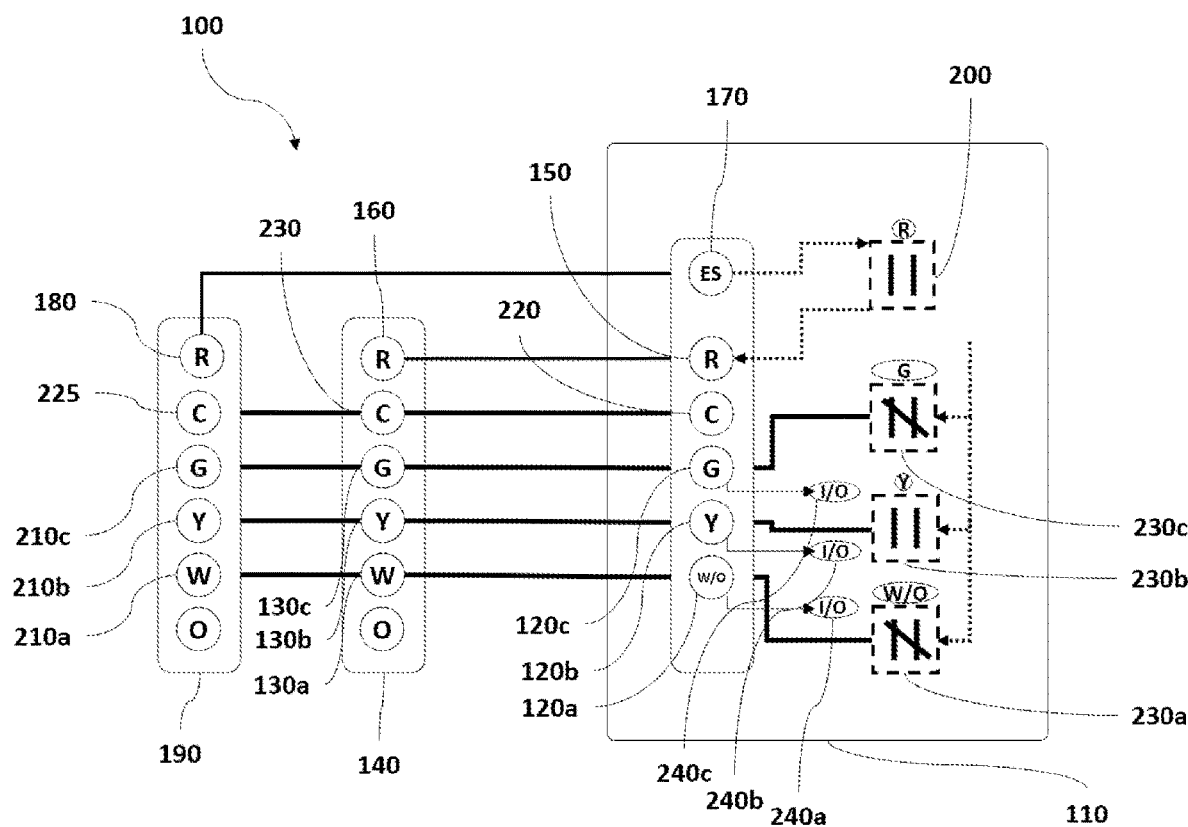
FIG. 6 shows the HVAC system of FIG. 1 when implementing a heating test in the implementation of FIG. 2.

FIG. 6 shows the HVAC system 100 of FIG. 2 when implementing a heating test. As shown, the HVAC controller 110 is incorporated into the HVAC system 100 as shown in FIG. 2, and the controllable power relay 200 of the HVAC controller 110 is opened.

As discussed in more detail below, with respect to FIG. 8, the heating test, as in the case of other preseason tests, may follow a specific sequence. Generally, after opening the controllable power relay 200, the control relays 230a, b, c of the HVAC controller 110 can be used to directly control the indoor unit 140. As such, in the case of a furnace and air conditioner based HVAC system 100, the heating test may call for energizing the W/O and G control terminals 120a, c by closing the corresponding control relays 230a, c, thereby activating the fan and furnace.

After implementing the testing procedure, the control relays 230a, c used during the testing are returned to their open state and the controllable power relay 200 is once again closed, thereby returning the HVAC system 100 to its normal operation state, as shown in FIG. 2.

Figure 7:
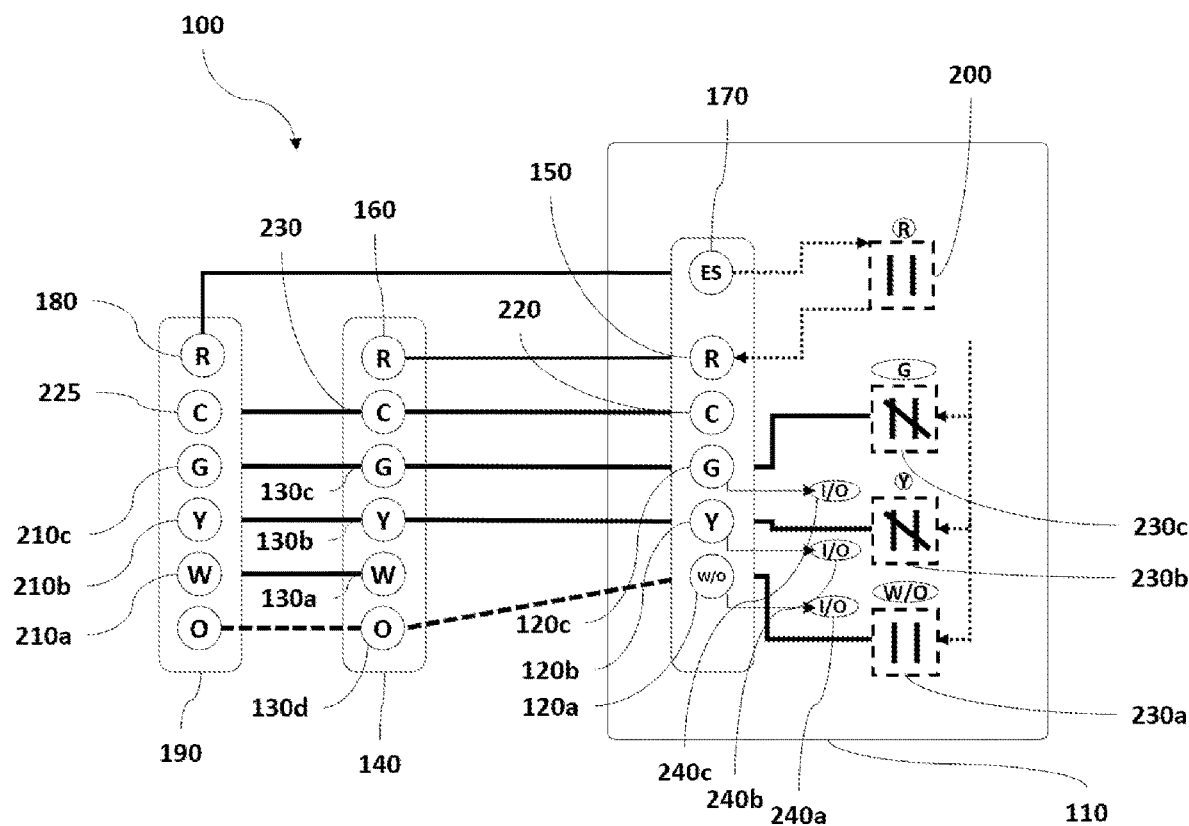
FIG. 7 shows the HVAC system of FIG. 1 when implementing a heating test in the alternative implementation of FIG. 2.

FIG. 7 shows the HVAC system 100 of FIG. 3 when implementing a heating test. As shown, the HVAC controller 110 is incorporated into the HVAC system 100 as shown in FIG. 3, and the controllable power relay 200 of the HVAC controller 110 is opened.

As discussed in more detail below with respect to FIG. 8, the heating test, as in the case of other preseason tests, may follow a specific sequence. Generally, after opening the controllable power relay 200, the control relays 230a, b, c of the HVAC controller 110 can be used to directly control the indoor unit 140. As such, in the case of a heat pump based HVAC system 100, the heating test may call for energizing each of the Y and G control terminals 120b, c by closing the corresponding control relays 230b, c, thereby activating the heat pump and fan.

After implementing the testing procedure, the control relays 230b, c used during the testing are returned to their open state and the controllable power relay 200 is once again closed, thereby returning the HVAC system 100 to its normal operation state, as shown in FIG. 3.

Figure 8:
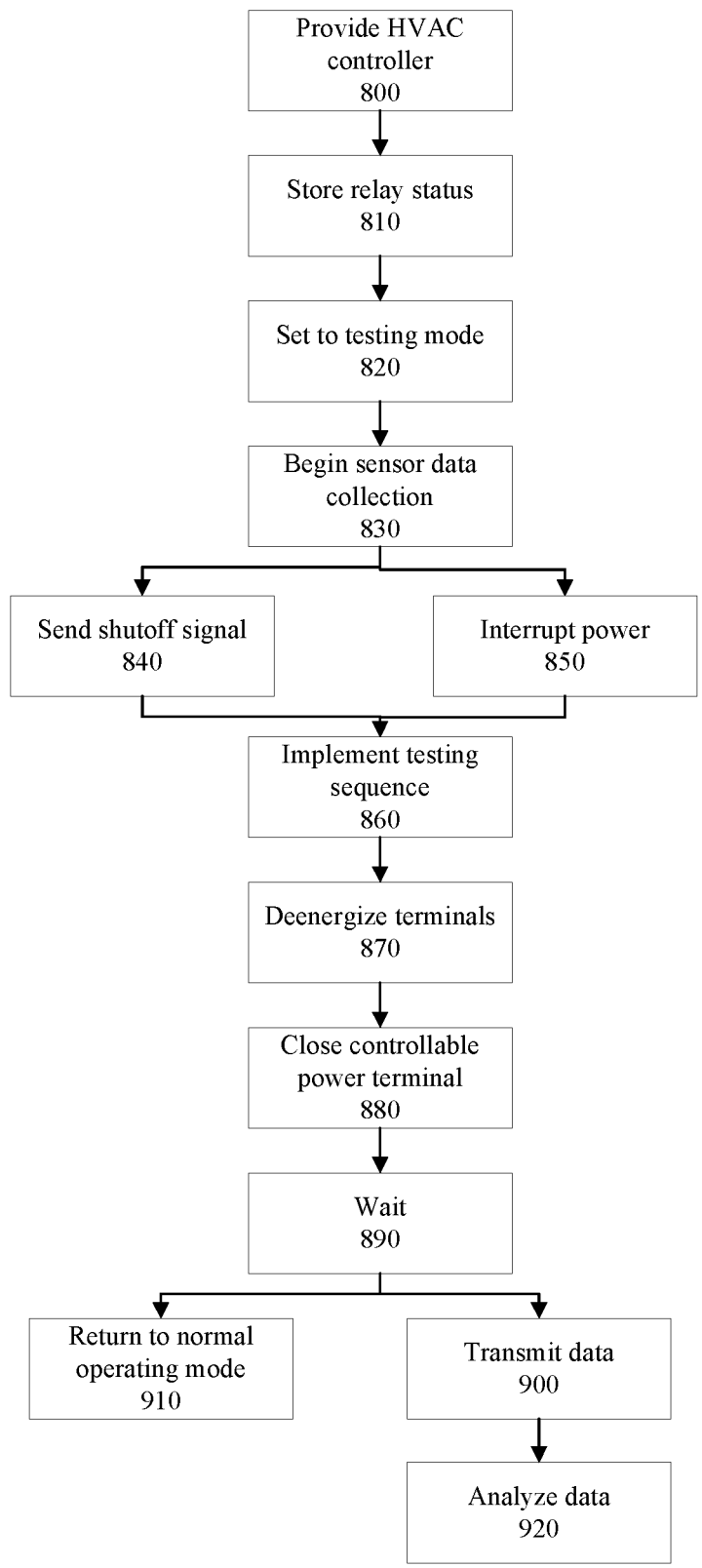
FIG. 8 is a flowchart illustrating a method for testing an HVAC system in accordance with this disclosure.

FIG. 8 is a flowchart illustrating a method for testing an HVAC system 100 in accordance with this disclosure. The HVAC system 100 may be provided with an HVAC controller 110 (at 800) having control terminals 120a, b, c which are coupled to corresponding control terminals 130a, b, c at an indoor unit 140. Such coupling is in accordance with that discussed above with respect to FIGS. 2 and 3, and may therefore vary based on the specific HVAC system being tested. As discussed above, in addition to the control terminals 120a, b, c, the HVAC controller has a controller power terminal 150 for connecting to a power terminal 160 of the indoor unit 140.

The HVAC controller 110 or a computerized system connected to the HVAC controller 110 may initially store (at 810) a current relay status of the HVAC system 100. This may be by way of the controllable terminals 120a, b, c functioning as probes, as discussed above, or it may be by way of some alternative direct access to a thermostat 190 of the HVAC system. The current status may be stored at a database, or it may be stored in memory on board the HVAC controller 110.

Once the current relay status is stored (at 810), the HVAC system is set to a testing, or preseason, mode (at 820). In doing so, the HVAC controller 110 may alert any external system that incoming data is to be treated as test data for the purpose of any alarms likely to be raised or alerts that are likely to be generated. In some embodiments, the HVAC controller 110 or a related system collects data from sensors constantly, including during normal operation of the HVAC system 100.

In such embodiments, sensor data generated while in the testing mode may be provided with a header that indicates that such data should not be considered standard data, and should not be used to generate alerts. Further, such a data header may indicate that the following sensor data should not be considered part of historic data used by the system after a test is performed.

Accordingly, in some embodiments, the method described herein generates a data record by recording the output of sensors associated with the HVAC controller 110. Such sensor output may include output of sensors incorporated into smart thermostats or IoT devices. Such a data record may be generated constantly, such that during normal use when no testing is being implemented, the data record incorporates data in a first format, and such that during testing, the data record incorporates data in a second format. The second format may, for example, incorporate the data header discussed above. When placing the HVAC controller 110 into testing mode (at 820), the data record transitions from the first format to the second format.

Accordingly, when the HVAC controller 110 processes data from the data record, it may generate alerts based on predetermined patterns within the data record. Such alerts are then generated only based on data in the first format, such that data generated during testing are not used to generate alerts.

As discussed above, the HVAC controller 110 may be provided with at least one temperature sensor or otherwise retrieve temperature data, and the HVAC controller generates a data record based on such a temperature sensor. The HVAC controller 110 may similarly utilize at least one pressure sensor or retrieve pressure data.

After setting all relevant equipment components to testing mode, the HVAC controller 110, or the related system, begins sensor data collection (at 830).

Once data is being recorded, the HVAC controller 110 transmits an electronic shutoff signal (at 840) to a thermostat 190 for the HVAC system 100 or, in the alternative, interrupts power provided (at 850) to the thermostat, thereby deactivating the thermostat. Such a shutoff signal (840) may instruct the thermostat to turn itself off until reactivated. Alternatively, as discussed above, a power interruption (at 850) may be implemented by terminating the provision of power to a power terminal 180 of the thermostat 190 from a shutoff terminal 170 of the HVAC controller 110.

Such a shutoff terminal 170 of the HVAC controller may be powered by a controller power terminal 150 which receives power from a power terminal 160 of an indoor unit, typically an R terminal. The shutoff terminal 170 may then be the only connection between the HVAC controller 110 and the thermostat 190 that is not directly coupled to the indoor unit 140. In such an embodiment, during normal use, the shutoff terminal 170 is electrically coupled to the power terminal 150 by way of a controllable power relay 200. During normal use, the controllable power relay 200 is then closed, and in order to implement the power interruption (at 850), the controllable power relay 200 is opened after initiation of the testing method.

In some embodiments, the status of the power relay 200 is used to determine an appropriate state of the data collection. Accordingly, when the controllable power relay 200 is open, the data collection incorporates the data in the second format, and when the controllable power relay is closed, the data collection incorporates the data in the first format. In other embodiments, the transitions are part of a sequence, defined herein, in order to incorporate waiting periods and exclude inconsistent data from the data stored in the first format.

Once the shutoff terminal 170 is deenergized, or in the off position, because the controllable power relay 200 is open, the thermostat 190 is disconnected from the indoor unit 140, as it can no longer transmit any signals from its own terminals 210*a, b, c*. At this point, a testing sequence is implemented (at 860) corresponding to the specific HVAC system 100 being tested (such as the furnace and air conditioner based system of FIG. 2 or the heat pump based system of FIG. 3). The testing sequence may be further determined by the specific test being implemented. For example, a cooling test would involve a testing sequence distinct from a heating test.

Accordingly, the testing sequences can vary widely. Four specific examples are provided below, but variations of each example are possible as well. The testing sequence (at 860) generally comprises energizing at least two of the control terminals 120*a, b, c* sequentially for preset periods of time while continuing to collect data (as initiated at 830).

Following the implementation of the testing sequence (at 860), the HVAC controller 110 deenergizes any active control terminals 120*a, b, c* (at 870). Such deactivation is typically by opening any closed control relays 230*a, b, c*, and may be in sequence and with delays in between each relay opening.

After all control relays 230*a, b, c* have been opened, the controllable power relay 200 is closed (at 880). Closing the power relay 200 at the HVAC controller 110 reconnects the thermostat 190 so that the inside unit 140 can once again be controlled by the thermostat. As noted above, in some embodiments, the thermostat 190 is deactivated by sending a signal indicating that it should shut down. In such an embodiment, instead of closing a power relay 200, a new signal may be transmitted from the HVAC controller 110 to the thermostat 190 indicating that the thermostat should restart.

After the thermostat 190 has been reactivated, in some embodiments, the HVAC controller 110 may wait some period of time (at 890) so that the HVAC system 100 can return to its normal operating steady state. For example, the HVAC controller may wait 10 minutes so that temperatures all normalize.

After the optional waiting period (at 890), the HVAC controller 110, or an external controller managing data for the method described, may transmit (900) the sensor data recorded during the test for analysis. Such transmission may be to an external cloud based system or a server managed by an off-site party implementing the test. Such data, which may be tagged as testing data using the data header discussed above, may then be analyzed and used to generate a report.

As discussed above, with respect to transitioning the HVAC system 100 to testing mode (at 820), the data record is transitioned from the first format to the second format in order to distinguish such testing data. In such embodiments, either before or after transmitting (at 900) the sensor data, the data record may transition from the second format back to the first format as part of a return to a normal operating mode (at 910). Such transition may be at any time after closing the controllable power relay 200 (at 880), but typically follows the waiting period (at 890) so that data generated while the HVAC system normalizes 890 does not affect patterns observed during normal operation.

The data generated may then be analyzed (at 920) based on the sensor readings and the corresponding terminal sequence implemented. Such analysis would typically be based only on data recorded in the second format and would analyze changes of temperature during the test sequence. The analysis may be used to produce detailed reports of HVAC operation, and may be used to generate recommendations on HVAC readiness for the upcoming season. Accordingly, during a winter season, the method described can be used to implement a cooling test to test an air conditioning system. Any potential failure risks or inefficiencies can then be identified and addressed preemptively prior to needing use of the air conditioning system.

In some embodiments, prior to initiating a testing sequence, the method may first check outdoor ambient temperature to determine if the temperature is in an appropriate range for testing. Accordingly, the method may confirm that the temperature is above or below a threshold associated with the corresponding heating or cooling test. For example, if an outdoor temperature is below a threshold temperature, such as 45 degrees, the method may abort a cooling test, while if an outdoor temperature is above a threshold temperature, such as 70 degrees, the method may abort a heating test.

As noted above, the method may implement a variety of testing sequences (at 860) after deactivating (at 840) or cutting off power to (at 850) the thermostat 190. In the context of a gas furnace and air conditioner HVAC system 100 implementing a cooling test, such a testing sequence may provide for closing the G terminal control relay 230*c* thereby energizing the G terminal 120*c* of the HVAC controller. This causes the inside unit 140 to call for the fan. The method may then run the fan for some period of time, such as five minutes.

The method may then close the Y terminal control relay 230*b*, thereby energizing the Y terminal 120*b* of the HVAC controller. This causes the inside unit 140 to call for cooling in addition to the fan. The HVAC controller 110 may then run the cooling system for a period of time, such as 11 minutes, while collecting data.

The HVAC controller 110 may then deenergize the terminals 120*b, c* in sequence (at 870) by first deenergizing the Y terminal 120*b* to deactivate the cooling unit. The method may then provide for a waiting period, such as 10 seconds, before utilizing the HVAC controller 110 deenergizing the G terminal 120*c* to deactivate the fan.

After this sequence, the method may implement a further waiting period, such as an additional 10 seconds, before reactivating the thermostat 190 by closing the controllable power relay 200 (at 880).

Alternatively, in the context of a heat pump based HVAC system 100 implementing a cooling test, such a testing sequence may provide for closing the G terminal control relay 230*c* thereby energizing the G terminal 120*c* of the HVAC controller. This causes the inside unit 140 to call for the fan. The method may then run the fan for some period of time, such as five minutes.

The method may then close the W/O terminal control relay 230*a*, thereby energizing the W/O terminal 120*a* of the HVAC controller. This causes the inside unit 140 to engage the reversing valve by way of its O terminal 130*d*. Typically, no waiting period is required after engaging the reversing valve.

The method may then cause the HVAC controller 110 to close the Y terminal control relay 230*b*, thereby energizing the Y terminal 120*b* of the HVAC controller 110. This causes the inside unit 140 to call for cooling. The HVAC controller 110 may then run the cooling system for a period of time, such as 11 minutes, while collecting data.

The HVAC controller 110 may then deenergize the terminals 120*a, b, c* in sequence (at 870) by first deenergizing the Y terminal 120*b* to deactivate the cooling unit. The method may then provide for a waiting period, such as 10 seconds, before utilizing the HVAC controller 110 to deenergize the W/O terminal 120*a*, thereby returning the reversing valve to its normal condition. Finally, the method may deenergize the G terminal 120*c* to deactivate the fan.

After this sequence, the method may implement a further waiting period, such as an additional 10 seconds, before reactivating the thermostat 190 by closing the controllable power relay 200 (at 880).

Alternatively, in the context of a gas furnace and air conditioner HVAC system 100 implementing a heating test, such a testing sequence may provide for closing the G terminal control relay 230*c* thereby energizing the G terminal 120*c* of the HVAC controller. This causes the inside unit 140 to call for the fan. The method may then run the fan for some period of time, such as five minutes.

The method may then close the W/O terminal control relay 230*a*, thereby energizing the W/O terminal 120*a* of the HVAC controller. This causes the inside unit 140 to call for heat in addition to the fan. The HVAC controller 110 may then run the heating system for a period of time, such as 11 minutes, while collecting data.

The HVAC controller 110 may then deenergize the terminals 120*a, c* in sequence (at 870) by first deenergizing the W/O terminal 120*a* to deactivate the heating unit. The method may then provide for a waiting period, such as 10 seconds, before utilizing the HVAC controller 110 deenergizing the G terminal 120*c* to deactivate the fan.

After this sequence, the method may implement a further waiting period, such as an additional 10 seconds, before reactivating the thermostat 190 by closing the controllable power relay 200 (at 880).

Alternatively, in the context of a heat pump based HVAC system 100 implementing a heating test, such a testing sequence may provide for closing the G terminal control relay 230*c* thereby energizing the G terminal 120*c* of the HVAC controller. This causes the inside unit 140 to call for the fan. The method may then run the fan for some period of time, such as five minutes.

The method may then close the Y terminal control relay 230*b*, thereby energizing the Y terminal 120*b* of the HVAC controller 110. This causes the inside unit 140 to call for heating. The HVAC controller 110 may then run the heating system for a period of time, such as 11 minutes, while collecting data.

The HVAC controller 110 may then deenergize the terminals 120*b, c* in sequence (at 870) by first deenergizing the Y terminal 120*b* to deactivate the cooling unit. The method may then provide for a waiting period, such as 10 seconds, before utilizing the HVAC controller 110 to deenergize the G terminal 120*c* to deactivate the fan.

After this sequence, the method may implement a further waiting period, such as an additional 10 seconds, before reactivating the thermostat 190 by closing the controllable power relay 200 (at 880).

Figure 9:
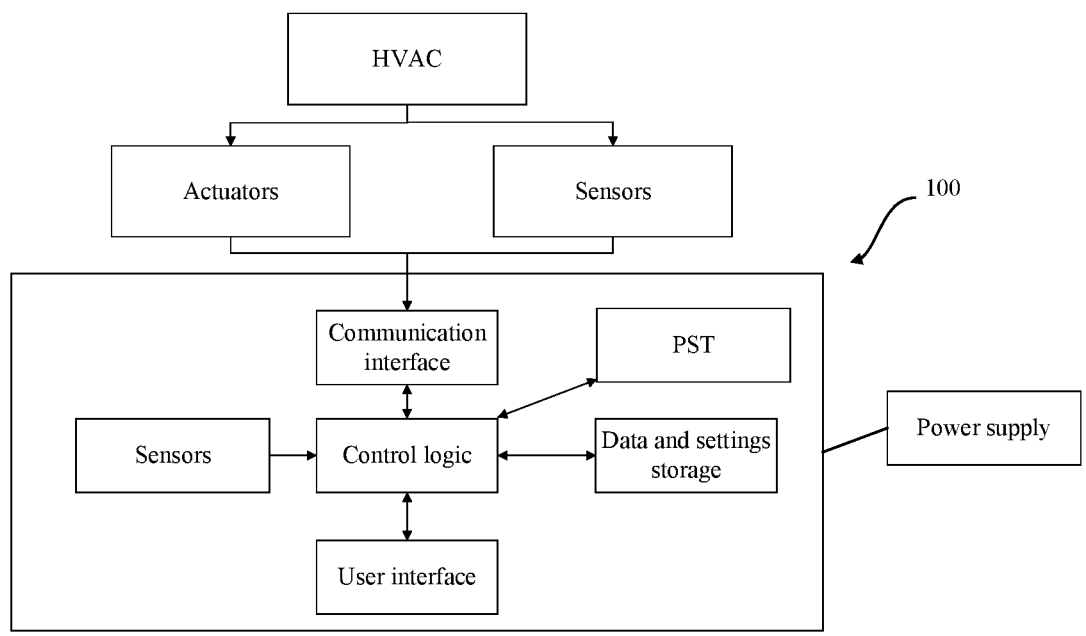
FIG. 9 shows an alternate embodiment of an HVAC system in accordance with this disclosure.

In some embodiments, the method described herein is implemented on hardware not including the HVAC controller 110 described and shown in reference to FIGS. 1-7. In such embodiments, the method may be implemented as a software package installed directly on a thermostat. FIG. 9 shows an alternate embodiment of an HVAC system 100 in accordance with this disclosure in which the method of FIG. 8 is implemented in thermostat firmware. As shown, the thermostat firmware may be flashed with custom code for performing remote control testing directly from the thermostat.

In such an embodiment, the preseason test module provided may directly override the control logic, as shown, and take the place of the data and settings and user interface that would otherwise control the thermostat.

The application may then implement the method of FIG. 8 and produce a detailed report of HVAC operation during the test.

Figure 10:
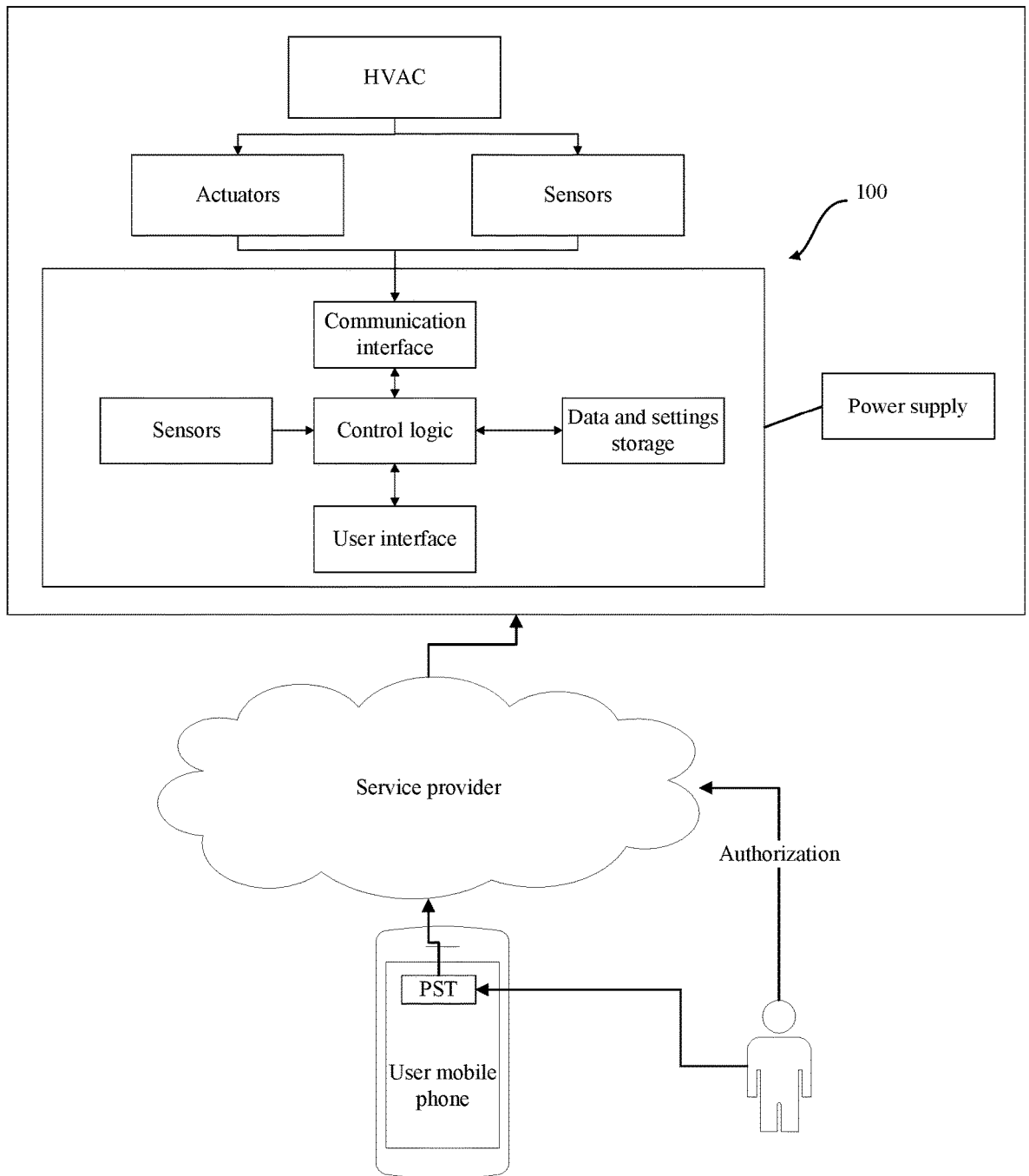
FIG. 10 shows an alternate embodiment of an HVAC system in accordance with this disclosure.

FIG. 10 shows an alternate embodiment of an HVAC system in accordance with this disclosure. As such, a software package may be maintained external to the thermostat itself which may then be implemented by a service provider. The preseason test may then be implemented on a third party device which is used to directly control the thermostat.

In some embodiments, the preseason testing application may be executed on a cloud interface by a third party organization, such as a service provider. The user may then pass authentication to the cloud service using OAuth. The preseason testing application may then run using a provided interface, such as REST. This approach can work with a wide variety of connected thermostats, including Ecobee, Honeybell Lyric, and Sensi.

Alternatively, as shown, the preseason testing application may be executed by a user on the user's mobile phone rather than a service provider cloud. This may be executed on, for example, the Nest and Google Home interface.

As discussed, the method leverages sensors for evaluating the results of the testing sequences described. Such sensors may be provided in a thermostat 190 being used to execute the testing sequence, or they may be provided in the HVAC controller 110 discussed above. Alternatively, and as noted above, the HVAC controller 110 may be provided with inputs for interfacing with internal or external sensors, such as independent IoT devices. This may be for implementing thermistors or other temperature sensing implementations as well as humidity, pressure, current or other fuel usage, vibration, and others.

Additionally, the HVAC controller 110 may be provided with additional features, such as condensation switch sensing and an expandable and updatable architecture. While three control relays 120*a, b, c* are described above, the HVAC controller 110 may be provided with additional configurable relays, providing flexibility for monitoring and controlling unique HVAC systems. For example, relays may be used to integrate the HVAC controller into multi-stage HVAC systems, or smart home systems incorporating, for example, smart vents that can be opened or closed remotely.

Similarly, additional relays allow for controlling and monitoring systems for indoor air quality, zoning, and non-HVAC applications.

Further, while the HVAC controller 110 described is used for monitoring and testing an indoor unit 140 for an HVAC system 100, outdoor sensor kits may be provided as well, such that the system can analyze testing results in the context of outdoor whether conditions.

The preseason test provided can be run remotely, such as by a contractor or service provided from a portal. As such, before visiting a site, a technician may execute a testing sequence and receive a report. The testing sequence can be scheduled based on a user schedule so as to run when a homeowner is not at home.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A heating, ventilation, and air conditioning (HVAC) controller comprising:
    a plurality of control terminals for connecting to corresponding control terminals on an indoor unit for an HVAC system;
    at least one controller power terminal for connecting to a power terminal on the indoor unit for the HVAC system;
    a shutoff terminal for connecting to a power terminal on a thermostat for the HVAC system, wherein interrupting power from the power terminal on the thermostat deactivates the thermostat; and
    a controllable power relay electrically coupling the shutoff terminal and the controller power terminal;
    wherein the controllable power relay is closed during normal HVAC system usage and is opened for a testing process; and
    wherein the shutoff terminal is the only connection between the HVAC controller and the thermostat that is not electrically coupled with the indoor unit.

2. The HVAC controller of claim 1 further comprising a plurality of controllable control relays for powering the control terminals of the HVAC controller.

3. The HVAC controller of claim 2, wherein the plurality of control terminals of the HVAC controller are controlled by a first relay for controlling a furnace terminal or reversing valve of a heat pump terminal of the plurality of control terminals of the HVAC controller, a second relay for controlling an air conditioner or heat pump terminal of the plurality of control terminals of the HVAC controller, and a third relay for controlling a fan terminal of the plurality of control terminals of the HVAC controller.

4. The HVAC controller of claim 1 wherein at least one of the plurality of control terminals of the HVAC controller are activated by the HVAC controller only when the controllable power relay is open.

5. The HVAC controller of claim 1 further comprising at least one temperature sensor, wherein the HVAC controller generates a data record comprising data from the temperature sensor upon activation of at least one of the plurality of control terminals of the HVAC controller.

6. The HVAC controller of claim 5 further comprising at least one pressure sensor, wherein the data record further comprising data from the pressure sensor.

7. The HVAC controller of claim 5 wherein at least a portion of the data record generated comprises a header embedded in a section of generated code, wherein the header prevents the HVAC system from recognizing data in the data record.

8. The HVAC controller of claim 7 wherein the plurality of control terminals of the HVAC controller are activated in a predetermined sequence and wherein the data record reflects the results of activation of the control terminals of the HVAC controller.

9. The HVAC controller of claim 7, wherein the data record is generated during all power relay positions, and wherein the data record comprises the header only for data corresponding to times when the power relay is open.

10. A method for testing a heating, ventilation, and air conditioning (HVAC) system, the method comprising:
    providing an HVAC controller, the HVAC controller comprising a plurality of control terminals, the plurality of control terminals of the HVAC controller being coupled to corresponding control terminals on an indoor unit for the HVAC system, and at least one controller power terminal for connecting to a power terminal of the indoor unit;
    transmitting an electronic shutoff signal to a thermostat for the HVAC system or interrupting power provided to the thermostat thereby deactivating the thermostat;
    directly controlling the indoor unit by way of at least one of the plurality of control terminals after deactivating the thermostat.

11. The method of claim 10 wherein the deactivating of the thermostat is by terminating the provision of power from a shutoff terminal of the HVAC controller, and wherein the shutoff terminal is the only connection between the HVAC controller and the thermostat that is not directly coupled to the indoor unit.

12. The method of claim 11, wherein during normal use the shutoff terminal is electrically coupled to the controller power terminal by a closed power relay, and where the power relay is opened after initiating the testing method.

13. The method of claim 12, wherein a current terminal status of the indoor unit, retrieved at the control terminals of the HVAC controller, is stored in a memory prior to transmitting the electronic shutoff signal.

14. The method of claim 12 further comprising energizing at least two of the control terminals of the HVAC controller in sequence for a preset period of time.

15. The method of claim 14 further comprising deenergizing all control terminals of the HVAC controller following the energizing of the at least two control terminals of the HVAC controller and closing the power relay after deenergizing all control terminals.

16. The method of claim 15 further comprising generating a data record by recording the output of sensors associated with the HVAC controller, wherein the data record incorporates data in a first format during normal use, and wherein the data record incorporates data in a second format, and wherein the data record transitions from the first format to the second format prior to transmitting the electronic shutoff signal and wherein the data record transitions from the second format to the first format after closing the power relay, and wherein the second format incorporates a sensor data header indicating a test sequence.

17. The method of claim 16 wherein the transition from the second format to the first format is delayed a predetermined period of time following the closing of the power relay.

18. The method of claim 16, wherein the HVAC controller processes data from the data record and generates alerts based on predetermined patterns within the data record, and wherein such alerts are generated only based on data in the first format.

19. The method of claim 16, the method further comprising analyzing a change in temperature during the test sequence based on the data in the second format.

20. The method of claim 10, the method corresponding to an implementation of a heating or cooling test and further comprising monitoring an outdoor ambient temperature and confirming that the temperature is above or below a threshold temperature associated with the corresponding heating or cooling test.

\* \* \* \* \*